April 10, 1962 G. C. DACEY ET AL 3,028,655

SEMICONDUCTIVE DEVICE

Filed March 23, 1955 3 Sheets-Sheet 1

INVENTORS: G. C. DACEY
C. A. LEE
W. SHOCKLEY

BY Arthur J. Torsiglieri
ATTORNEY

April 10, 1962 G. C. DACEY ET AL 3,028,655

SEMICONDUCTIVE DEVICE

Filed March 23, 1955 3 Sheets-Sheet 2

INVENTORS: G. C. DACEY
C. A. LEE
W. SHOCKLEY

BY Arthur J. Torsiglieri
ATTORNEY

April 10, 1962 G. C. DACEY ET AL 3,028,655

SEMICONDUCTIVE DEVICE

Filed March 23, 1955 3 Sheets-Sheet 3

INVENTORS: G.C. DACEY
C.A. LEE
W. SHOCKLEY

BY Arthur J. Torsiglieri
ATTORNEY 3,028,655

SEMICONDUCTIVE DEVICE

George C. Dacey, Chatham, Charles A. Lee, New Providence, and William Shockley, Madison, N.J., assignors to Bell Telephone Laboratories, Incorporated, New York, N.Y., a corporation of New York Filed Mar. 23, 1955, Ser. No. 496,202
6 Claims. (Cl. 29—25.3)

This invention relates to semiconductive devices, more particularly of the kinds generally designated as junction transistors and field effect transistors, and to methods for fabricating such devices.

In such devices to be operated at high frequencies, it is generally desirable to employ a semiconductive body which includes a thin zone of one conductivity type which is contiguous with a zone of opposite conductivity. It is characteristic of the general principles of the invention that it facilitates the realization of such bodies.

It will be convenient to discuss initially the application of the principles of the invention with particular reference to the fabrication of junction transistors, reserving for later discussion the applicaion of similar principles to the manufacture of field-effect transistors.

A junction transistor generally comprises a semiconductive body, commonly of germanium, which includes a plurality of contiguous zones of different conductivity types defining one or more P-N junctions in the body. In the usual form of junction transistor, a germanium body comprises a base region of one conductivity type, for example, p-type, which is intermediate between and contiguous with emitter and collector zones of opposite or n-type conductivity. In common alternative forms, the emitter may be a point contact electrode making rectifying contact with the base zone or an intrinsic region may be interposed between the base and collector zones as described in an article entitled "P-N-I-P and N-P-I-N Junction Transistor Triodes," by J. M. Early, published in the Bell System Technical Journal, May 1954, pages 517 through 534.

It is characteristic of the mode of operation of junction transistors of this kind that minority charge carriers are injected into the base zone from the emitter under the control of signal information for travel thereacross to the collector zone, there giving rise to output currents in the circuitry associated with the collector zone. The injected carriers in the usual form of junction transistor move across the base zone largely as a result of diffusion, although it is possible by a proper gradient in the concentration of significant impurity atoms in the base zone to establish a "built-in" electrostatic field which imparts a drift to the injected minority carriers to augment diffusion. It is characteristic of the role of the base zone in such operation that it, to a large degree, determines the output characteristics of the transistors. For uniformity of output characteristics from one transistor to another, it is necessary to have uniformity in the base zones among the transistors. Accordingly, it is important that the method of making such transistors be one which lends itself conveniently to good reproducibility of the base zones.

However, it is further characteristic of the role of the base zone in a junction transistor that particular configurations and impurity distributions are necessary therefor which militate against ready reproducibility. In particular, since the transit time for diffusion of the minority carriers across the base zone serves as an upper limit on the frequency of operation at which significant gain is realized, it is important for good high frequency response that the width of the base zone be narrow.

Hitherto, in fabricating junction transistors for use at high frequencies, the processes employed have not lent themselves well to good reproducibility on a mass production scale. For example, one common process is based on converting the conductivity type of opposite faces of a thin semiconductive wafer for forming emitter and collector zones on opposite sides of an unconverted intermediate zone which then serves as the base zone. Various specific processes based on this same general principle are known. However, it is evident that for accurate control of the width of the base zone in processes of this kind, it is necessary to control accurately both the width of the thin semiconductive wafer with which one begins, and the depths of penetration into the wafer of the two converted surface zones. In particular, when the thicknesses of the emitter and collector zones are large in comparison with the desired width of the base zone, as is usually the case in transistors made by techniques of this kind, small fractional errors in the thicknesses of these emitter and collector zones and of the semiconductive body lead to large fractional errors in the final thickness of the base zone. Accordingly, uniformity of reproduction is difficult to achieve by such techniques, particularly when it is desired to reproduce accurately and in quantity transistors having base zones of a fraction of a mil in width.

Moreover, various other known processes for forming intermediate zones of one extrinsic conductivity type between two zones of opposite extrinsic conductivity type, for example, those which involve variations in growth rate or doping with significant impurities during the growing of a semiconductive crystal, also are not completely satisfactory or are of limited application for the large scale manufacture of semiconductive bodies having a precisely controlled thin intermediate zone of one extrinsic conductivity type between two zones of opposite extrinsic conductivity type.

Additionally, as indicated above, it has been known hitherto that by a proper gradient in the concentration of significant impurity atoms in the base zone of a junction transistor there may be built into the base zone an electrostatic field which adds a drift velocity to the diffusion velocity of the minority carriers injected for travel thereacross. If such drift is made to augment diffsion, the time of transit across the base zone for such injected minority carriers may be reduced and the upper frequency limit of the transistor raised.

However, the processes used hitherto for the fabrication of junction transistors ordinarily do not provide a sufficiently large gradient in the concentration of the significant impurity atoms to be completely suitable for this purpose.

Accordingly, it is another object of the invention to facilitate the fabrication of a junction transistor whose base zone is characterized by a gradient in the concentration of the significant impurity atoms, which results in reduced transit times for injected minority carriers.

To these ends, the invention provides a method for the fabrication of junction transistors which permits greater control for better reproducibility and simultaneously results in a configuration which is characterized by improved performance.

An important feature of the present invention is the formation, at an early stage of the process of manufacture of a junction transistor, on the surface of a semiconductive body of one conductivity type a significant impurity-diffused layer of opposite conductivity type which eventually is to serve as the base zone of the junction transistor and the subsequent conversion of a surface portion, or skin, of the diffused layer to its original conductivity type for forming the emitter zone of the junction transistor. Such a diffused surface layer can conveniently be made to a very accurately controlled depth and resistivity when formed in accordance with the vapor-solid diffusion techniques to be described below. It is characteristic of vapor-solid diffusion techniques that the semiconductive body is exposed to a vapor including the significant impurity while being maintained at a temperature that results in diffusion of the impurity into the solid body. Additionally, such a diffused layer can readily be made by vapor-solid diffusion techniques to have a gradient in the concentration of diffused significant impurity atoms which builds in the desired electrostatic field.

In particular, in a preferred embodiment of the invention arsenic is diffused from a vapor state into the surface of a p-type germanium body to form an n-type surface zone of prescribed characteristics. In combination with this diffusion technique for forming the base zone, a related feature of a preferred form of the invention is the formation of the emitter zone of the junction transistor by the evaporation, on a selected portion of the diffused surface layer for subsequent fusion thereto, of a controlled amount of a significant impurity element of a type whose properties are opposite to those of the diffusant introduced previously to form the diffused surface layer. It is important to the success of this step that the concentration of the diffusant originally introduced be low at the surface portion of the diffused layer to be converted since otherwise this region will not thereafter be suitable as an emitter zone. In particular, as will be discussed below, it is important that the surface concentration of such diffusant be less than of the order of $10^{18}$ atoms per cubic centimeter if an emitter zone of high injection efficiency, necessary for a transistor of high alpha, is to be obtained. This technique for forming the emitter zone makes feasible accurate control of the emitter geometry and minimum degradation of the diffused surface base layer. In particular in the preferred embodiment, the emitter zone is advantageously formed by the evaporation and subsequent alloyage of an aluminum film on the arsenic-diffused surface layer. The choice of aluminum is found advantageous since in such an application it has desirable wetting properties which make for good control of emitter geometry.

A specific feature of the preferred embodiment is the alloyage of the aluminum film to the arsenic-diffused surface layer for forming the emitter zone by a heating cycle which includes heating for about one minute at the eutectic temperature followed by flash heating for less than one second at a higher temperature.

In an alternative embodiment, the conductivity type of a surface portion of the original diffused layer formed to serve as the base zone is converted by a second vapor-solid diffusion process and such new diffused surface layer is made to serve as the emitter zone. Still other techniques may be employed for converting a surface zone of the diffused layer, such as the use of ionic bombardment as described in copending application Serial No. 141,512 filed January 31, 1950, by R. S. Ohl and having the same assignee as this application and now Patent No 2,750.541.

The general prinicples described above can be applied in similar fashion to the fabrication of semiconductive bodies for use in a field-effect transistor. The principles of such a transistor are described in an article entitled "A Unipolar Field Effect Transistor," by W. Shockley, Proceedings of the I.R.E., pages 1365 through 1376, November 1952. For the formation of a semiconductive body for use in such a device, a thin surface layer of one conductivity type is formed on a semiconductive body of opposite conductivity type by vapor-solid diffusion therein of a suitable significant impurity, as discussed above. A surface portion of this diffused layer is reconverted to the opposite conductivity by the techniques discussed above and this reconverted portion serves as the gate of the field-effect transistor. Additionally, ohmic connections are made to the diffused layer on opopsite sides of the gate for serving as the source and drain, respectively.

The invention will be better understood from the following more detailed description taken in conjunction with the drawing in which.

The application of the principles of the invention will be described with reference to the fabrication of a germanium p-n-p junction transistor of typical design. It will, of course, be evident that the principles may be applied to transistors of other designs.

It is to be noted that the disparate values of the various dimensions involved make it inconvenient for the drawings to be scale.

Figure 1A:
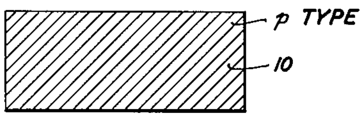
FIGS. 1A through 1G show in cross section in successive stages of its process of manufacture a diffused base junction transistor of the p-n-p type, made in accordance with the preferred embodiment of the invention.

With reference now to the drawing, FIG. 1A shows a germanium wafer 10 in cylindrical form which has a thickness, or height, of 10 mils and a radius of 50 mils. The germanium wafer is single crystal material of p-type conductivity, and advantageously of about 5 ohm-centimeter resistivity. Typically, such a resistivity and conductivity type is attained by doping the germanium melt, from which the single crystal is grown, with gallium.

As a preliminary step in the preferred embodiment of the process forming the invention, it is usually important to rid the surface of the wafer of all traces of undesirable impurities, especially copper which is a particularly active impurity in germanium. To this end, the wafer is advantageously soaked in potassium cyanide in accordance with a method described in copending application Serial No. 334,972, filed February 3, 1953, by R. A. Logan and M. Sparks, now Patent No. 2,698,780, and thereafter washed with deionized water and blotted dry.

The clean germanium wafer is now ready for the formation of a surface diffusion layer of n-type conductivity. An important characteristic of the preferred embodiment of the invention is the use of arsenic as the diffusant. Arsenic has proved especially amenable to accurate control, and accurate control of the diffused surface layer is vital to the process of the invention. The arsenic-diffused surface layer advantageously is formed in accordance with the vapor solid diffusion method described in copending application Serial No. 496,201, filed March 23, 1955, by W. Shockley, and having the same assignee as this application and now Patent No. 2,868,678.

In accordance with this technique, the clean germanium wafer is loaded into a clean oven, preferably of molybdenum since such as oven can more readily be kept copper-free. There is also inserted into the oven a charge of germanium, most economically of polycrystalline material but of high purity, which has been doped with arsenic to have a body concentration of arsenic which is larger by a prescribed amount than the arsenic concentration desired for the arsenic-diffused surface layer to be formed on the wafer.

In particular, it is found advantageous to employ in this way germanium which has been doped to have a body concentration of approximately $10^{19}$ atoms/cubic centimeter of arsenic to provide an arsenic concentration at the surface of the diffused layer of the specimen being treated of approximately $2\times10^{17}$ atoms per cubic centimeters. The amount of arsenic in otherwise relatively pure germanium can be readily determined by resistivity measurements.

The germanium wafer is then heated in the oven at 800° C. for about fifteen minutes in the arsenic vapor which results from arsenic diffusing out of the heated polycrystalline germanium and an arsenic-diffused surface layer is formed on the wafer. It is characteristic of this diffusion process that the concentration of arsenic atoms will decrease in accordance with a complementary error function with increasing distance in from the surface of the wafer. It is this gradient in the concentration of arsenic atoms that gives rise to an electrostatic field in the base zone which acts to impart a drift velocity to the minority carriers injected from the emitter zone for travel across the base zone. In particular, in the specific embodiment being described, the heat treatment recited results in the formation of a surface diffusion layer about .18 mil thick with a surface concentration of $2\times10^{17}$ arsenic atoms per cubic centimeter resulting in a surface conductivity of approximately $10^{-2}$ mho per square centimeter. The arsenic concentration decreases with increasing distance into the wafer as previously discussed. Calculations made as to the total number of arsenic atoms diffused per square centimeter of surface established that such number is a fraction of the number in a square centimeter monolayer of arsenic atoms. It has been found advantageous to avoid exceeding a surface concentration of $10^{18}$ atoms per cubic centimeter of arsenic in this diffused layer in order to make feasible the formation of a good aluminum-fused emitter zone thereon.

In some instances, the process described may be modified to provide a peak concentration of arsenic atoms at a region in from the surface and a reduced concentration on the skin in the manner described more fully in said copending W. Shockley application. Such a skin of reduced arsenic concentration may be more readily adapted for use as an emitter zone.

Alternatively, a suitable arsenic-diffused surface layer may be formed in accordance with vapor-solid diffusion principles by heating an arsenic mass to a temperature which provides a suitable vapor pressure of arsenic and heating a germanium body in the presence of the arsenic vapor at a temperature suitable for diffusion of the arsenic into the wafer. Ordinarily, to avoid excessive surface concentrations of arsenic and at the same time achieve the desired amount of penetration of the arsenic, it is advantageous to have two zones of different temperatures and to heat the germanium wafer to a temperature higher than that used to vaporize the arsenic.

Figure 1B:
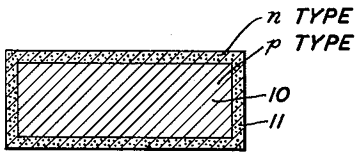

FIG. 1B shows the germanium wafer 10 over whose surface there is formed an n-type arsenic-diffused layer 11. In the completed junction transistor, the interior portion of this arsenic-diffused layer 11 serves as the base region.

It is characteristic of these surface diffusion techniques that the resistivity and thickness of the diffusion layer can be readily controlled to a high degree of accuracy since all of the parameters involved are amenable to accurate control. The concentration of arsenic atoms diffused into the surface of the germanium wafer can be made to have a prescribed value, and the depth of penetration of this diffusion layer may be accurately controlled by the temperature and heating time. Accordingly, since all of the factors which control the resistivity and depth of peneration of this surface diffusion layer are amenable to accurate control and can readily be reproduced as often as desired, it is easy to manufacture in quantities wafers having similar arsenic-diffused surface layers.

As a succeeding step of the process in accordance with the invention, there is formed an emitter zone of a portion of the skin of the arsenic-diffused surface layer.

Figure 1C:
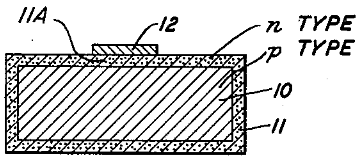

It is in accordance with another feature of the preferred form of the invention to form this emitter zone by the evaporation on a selected portion of the diffused surface layer of the wafer of a metallic significant impurity which permits ease of control of geometry, advantageously aluminum. To this end, it is important to mask those portions of the wafer which are to be kept free from the aluminum vapor during the evaporation process. Suitable masking techniques are known to one skilled in the art. Typically, the wafer may be supported in a structure which allows only a portion of the diffused surface layer of the wafer to be exposed to the aluminum vapor. It is desirable to observe precautions to prevent shadowing of the aluminum at the boundary of the film deposited. The process used for the evaporation should be one amenable to accurate control of the amount and the geometry of the aluminum deposited and advantageously one which does not involve appreciable heating of the germanium wafer. Suitable processes are described in a book entitled "Vacuum Techniques" by S. Dushman, J. Wiley and Sons, New York, New York (1949). In FIG. 1C there is shown a germanium wafer 10 which has an arsenic-diffused surface layer 11 on a portion 11A of which there is deposited a film of aluminum 12 in a circular spot of about 40 mils diameter and a thickness of approximately 1000 angstroms.

Figure 1D:
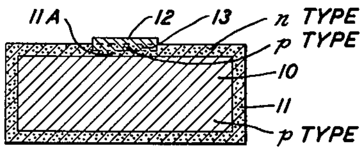

The aluminum film is then alloyed to the germanium wafer to form a p-type aluminum-alloyed skin on the portion 11A of the n-type arsenic-diffused zone on which the aluminum film has been deposited. The alloyage advantageously is accomplished by positioning the germanium wafer on a strip heater of the usual form and first heating the wafer to the aluminum-germanium eutectic temperature of approximately 424° C. in a hydrogen atmosphere for approximately one minute. This first part of the alloying cycle insures uniform wetting of the germanium surface by the aluminum, a factor which is important for good reproducibility of characteristics. Thereafter, in accordance with another feature of this preferred embodiment, as a second part of the alloying cycle, the germanium wafer is flash heated to about 700° C. for a very short interval, advantageously only about one-half a second for forming on the wafer surface a liquid phase which is about 55 percent aluminum and 45 percent germanium, in terms of the number of atoms, for alloyage of the aluminum to the germanium. It has been found advantageous that the time of this high temperature part of the alloying cycle be short in order to minimize contamination of the junction formed. It has been found that if the wafer is held at the elevated temperature for an extended period of time, the characteristics of the junction formed are relatively poorer. In FIG. 1D there is shown the germanium wafer after alloyage of the aluminum film to its surface. In crystallizing, a regrowth portion 13 of the portion 11A of the arsenic-diffused surface layer 11 is converted to p-type because of the introduction of aluminum from the aluminum film 12. Modifications are possible in this preferred technique for forming the aluminum fused emitter, such as heating of the wafer slightly above the eutectic temperature during evaporation of the aluminum film. It will be convenient to describe this technique which involves the recrystallization from a liquid phase of one or more components and the semiconductor as fusing and the junction formed at the regrowth interface as a fused junction. This is to be distinguished from the technique described throughout as diffusion, which does not involve any melting of the semiconductor and so any such recrystallization.

There is made available as a result of the steps described a semiconductive body which is of p-n-p conductivity type distribution. There is an n-type arsenic-diffused layer 11A between the p-type bulk 10 and the p-type aluminum-alloyed layer 13. For the formation of a p-n-p junction transistor, it is now only necessary to make appropriate electrode connections to the different zones of the body. In practice, it is found that there is a residual surface film of almost pure aluminum on the aluminum-alloyed p-type zone 13 which may be used advantageously as the emitter electrode, but it is generally preferable to deposit a metallic film on the arsenic-diffused layer to serve as the base electrode.

Figure 1E:
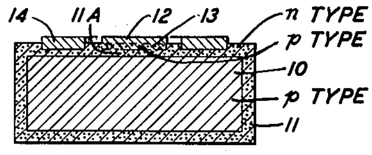

There is accordingly formed on selected portions of the diffused surface layer 11 as another step of the process a metallic film to serve as the base electrode connection. To this end, there is advantageously evaporated a thin film (approximately 4000 angstroms) of a gold-antimony alloy (Au-.01% Sb) in an annular configuration surrounding the emitter electrode 12 formed on the surface of the body. Any technique of the many known may be used for the deposit of the gold-antimony film so long as it permits a high degree of accuracy in the geometry and the amount of the film deposited and yet avoids significant heating of the germanium body. After the gold-antimony film has been deposited, a heating cycle is used to alloy the film to the arsenic-diffused surface layer of the body. To this end, the germanium wafer is heated to about 356° C. (the gold-germanium eutectic) until such time as the film begins to alloy with the germanium and then the heat source is turned off before the alloyage of the film is complete. In particular, the heating is discontinued as soon as the gold-antimony film is observed to wet the wafer surface. FIG. 1E shows the germanium wafer of FIG. 1D on which there has been added a gold-antimony ring electrode 14 surrounding the aluminum emitter electrode 12.

Figure 2:
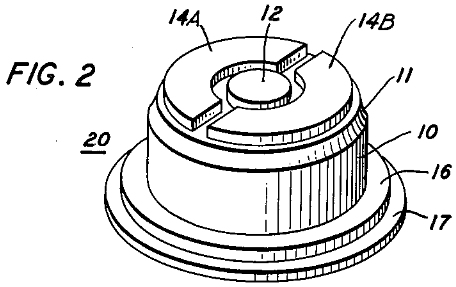
FIGS. 2, 3 and 4 show in perspective various forms of diffused base junction transistors fabricated in accordance with the process illustrated by FIGS. 1A through 1G.

Moreover, in the manufacture of a semiconductive unit for use as a tetrode junction transistor (i.e., one in which two spaced electrode connections are made to the base zone across which a D.-C. bias may be applied), instead of depositing a complete ring for surrounding the aluminum emitter electrode, two separate and spaced segments forming a split ring are deposited surrounding the aluminum emitter electrode as shown in FIG. 2.

Figure 1F:
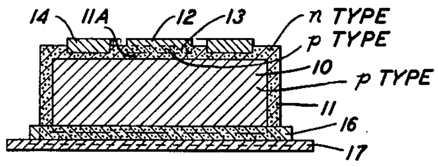
Figure 1G:
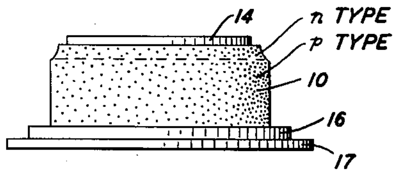

There still remains to form an ohmic connection to the bulk p-type portion of the body to serve as the collector electrode. To avoid having to remove the arsenic-diffused surface layer in the region to which connection is to be made, it is advantageous to solder through the arsenic-diffused surface layer for bonding the collector electrode to the interior of the wafer. In such a case, it is desirable to include an acceptor impurity in the soldering agent. To this end, in the preferred embodiment as shown in FIG. 1F, a mass of indium 16 has been used as a solder to bond a platinum tab 17 which serves as the collector electrode to the back face (the face opposite that of the emitter electrode) of the germanium wafer, the indium penetrating completely through the thin arsenic-diffused skin. Advantageously, the same heating step used for alloying the gold base film to one face of the germanium may be employed for alloying the collector electrode to the opposite face of the germanium. Then after the top face of the wafer has been suitably masked, the collector junction is revealed by placing for approximately 40 seconds the wafer in a suitable acid etch, for example, CP–4 described in U.S. Patent 2,619,414 which issued November 25, 1952. The protective mask is then removed from the emitter face. FIG. 1G shows the wafer after the collector junction has been revealed by the acid etch.

FIG. 2 shows in perspective a tetrode junction transistor 20 of a design achieved in accordance with the process described in connection with FIGS. 1A through 1G. The design of this unit has been chosen for operation with collector currents as high as 500 milliamperes. The reference numerals used are the same used in the discussion of FIGS. 1A through 1G.

It finally remains to provide wire leads to the various electrode connections, which can be done in the usual fashion, and to encapsulate the assembly suitably.

Figure 3:
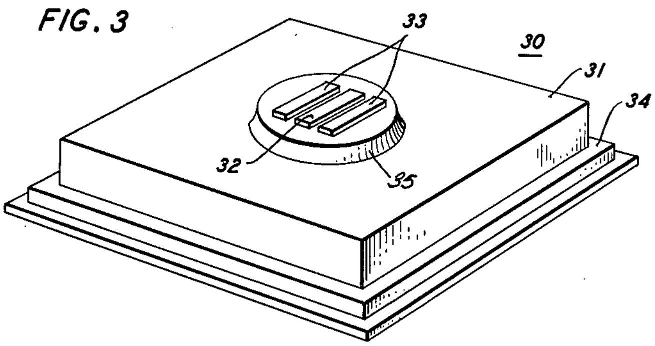

FIG. 3 shows in perspective a tetrode junction transistor 30 which has been fabricated in accordance with a process described to a design which is intended to extend the upper frequency limit of the operating range at the expense of the maximum collector curernt capacity. In this unit, the p-type germanium wafer 31 was initially a block 50 mils square and ten mils thick of single crystal material of approximately 5 ohm-centimeters resistivity. The depth of the arsenic-diffused surface layer is .028 mil and the arsenic concentration at the surface of this layer approximately $5\times10^{17}$ atoms/square centimeter. The emitter 32 is formed by the deposit of a film of aluminum one mil wide and six mils long. The gold-antimony base electrodes 33 have straight line geometries and are spaced on opposite sides of the emitter electrode, extending parallel thereto and spaced apart therefrom approximately one-half a mil. The line geometry of the emitter electrode and the base electrode connections is found especially advantageous for fabricating a unit designed for high frequency response. For example, the unit being described has an alpha cutoff frequency of about 180 megacycles per second. Finally, the collector boundary is revealed by a suitable etching in a circular pattern of about twelve mils diameter surrounding the emitter and base electrodes. After this etching step the emitter and base zones are included within a mesa 35 rising on the collector zone, as is seen in the drawing. There is also provided a collector electrode 34.

Figure 4:
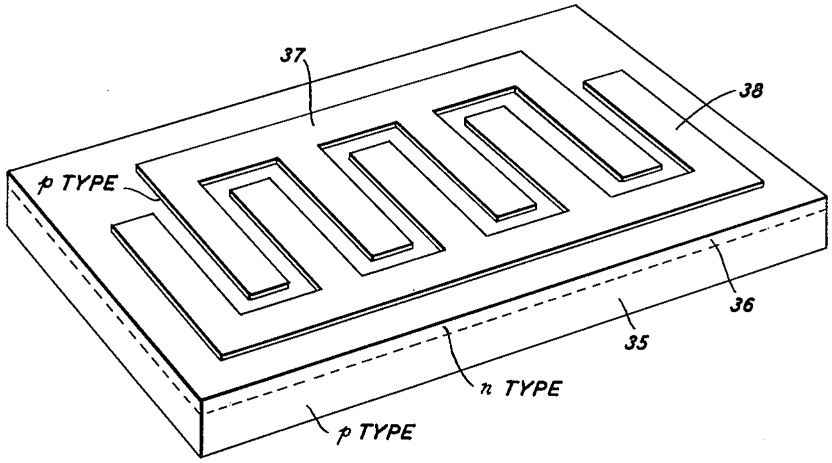

In FIG. 4, there is shown a semiconductive body 35 for use in a junction transistor made in accordance with the process described to have an emitter zone of alternative configuration. In this case, a p-type germanium body 35 has had diffused on one face thereof arsenic to form an n-type surface zone 36. Subsequently, an aluminum film of comblike configuration has been evaporated on this surface zone and fused thereto for forming of the substrate skin portion thereof a p-type zone 37 which serves as the emitter. Additionally, a gold-antimony film of comblike configuration interleaved with the emitter zone has been fused to the n-type surface zone for forming ohmic connection thereto to serve as the base electrode 38.

Figure 5:
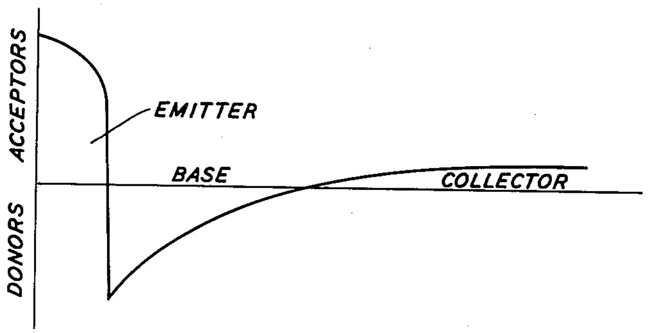
FIG. 5 is a plot of the concentrations of the predominant significant impurity atoms in successive zones of a junction transistor constructed in accordance with the process illustrated by FIGS. 1A through 1G.

In FIG. 5, there is plotted the relative concentrations of predominant significant impurities in successive zones of a junction transistor of the kind shown in FIGS. 2 and 3 constructed in accordance with the invention. The distance into the germanium wafer is plotted as the abscissa. Relative acceptor impurity concentrations are plotted as positive ordinate values and relative donor impurity concentrations as negative ordinate values. The emitter and collector zones are each seen to be characterized by a predominance of acceptor atoms, giving rise to p-type conductivity and the base zone by a predominance of donor atoms, giving rise to n-type conductivity. Additionally, the predominance of donor atoms is seen to decrease with distance away from the emitter zone in the direction of the collector zone. It is a gradient of this sort which gives rise to an electrostatic field which acts to reduce the time of transit across the base zone of injected holes, increasing thereby the upper limit of the useful operating frequency range. The general principles relating to the use of a built-in electrostatic field in this way are described in a copending application, Serial No. 465,376, filed October 28, 1954, by W. G. Pfann and having the same assignee as this application.

As has been indicated previously, various modifications are possible in the preferred embodiment which has been described in detail. First, for forming an n-type diffused surface zone which is to serve as the base zone other donor elements may in some cases be used in place of arsenic. Typically, antimony, phosphorus and bismuth may be substituted. Moreover, for forming an ohmic connection to serve as the base electrode to the diffused base zone, alternatives such as a tin-antimony alloy may be used instead of the gold-antimony alloy described.

Additionally, in place of aluminum as the impurity in forming the emitter zone, other suitable acceptor elements may be employed, such as indium or boron. In particular, when an element such as boron is employed, it may be preferable to convert a skin portion of the first diffused-surface layer by a subsequent vapor-solid diffusion process. Typically, boron tetrachloride may be heated and the boron vapor allowed to diffuse into a shallow surface portion of the n-type diffused layer for converting it to p-type for use as the emitter zone. Additionally, ionic bombardment technique may be employed for forming the emitter zone.

Additionally, the collector electrode to the p-type bulk may, for example, be formed by use of a gold-gallium alloy as a fusing agent in place of the indium described.

Moreover, it is feasible to fabricate germanium n-p-n junction transistors which have a diffused base zone in accordance with similar principles by an appropriate modification in parameters. In particular, aluminum and boron typically may be used as acceptor-type diffusants in forming the diffused base zone, and arsenic, phosphorus and bismuth as the donor-type impurities for converting a skin portion of this first formed diffused surface layer for use as the emitter zone.

Moreover, although germanium is usually the preferred semiconductive material for use in junction transistors, there are instances in which the semiconductive body is advantageously of some other material, such as silicon, a germanium-silicon alloy or a group III—group V compound such as indium-antimonide or aluminum-arsenide. Junction transistors utilizing semiconductive bodies of such materials advantageously may be fabricated in accordance with the general principles described by an appropriate selection of parameters.

Moreover, the principles of the invention may be extended readily to the fabrication of junction transistors of the kind described in the aforementioned Bell System Technical Journal which are characterized by an intrinsic zone intermediate between the base and collector zones for improved high frequency performance.

Figure 6:
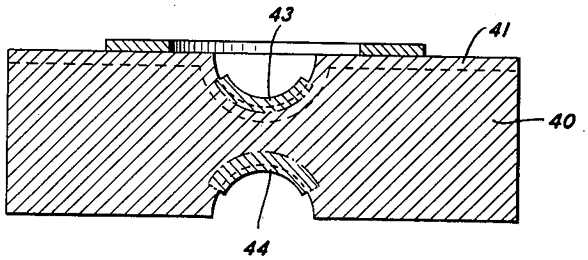
FIG. 6 shows in cross section a p-n-i-p junction transistor which has been fabricated in accordance with another embodiment of the invention.

It will be convenient to discuss the application of the principles of the invention with specific reference to the fabrication of a typical design of germanium p-n-i-p unit of the kind shown in cross-section in FIG. 6.

For the fabrication of such a unit, an n-type diffused surface layer 41 is formed on a monocrystalline germanium wafer 40 of substantially intrinsic conductivity which has been provided with a dimpled region by suitable localized etching techniques. Advantageously, this n-type layer 41 is formed by the diffusion of arenic in the manner described above. Thereafter by suitable etching techniques, this n-type surface layer is removed from the germanium body except on that portion of the surface which forms the front face, i.e., the face on which the emitter zone is to be formed. There is then converted a surface portion of the remaining n-type surface layer to p-type for forming the emitter zone 43 as described above and additionally a surface portion of the back face of the intrinsic region is converted to p-type for forming the collector zone 44. Advantageously, this, too, is achieved by the evaporation of aluminum and subsequent alloyage to the pertinent portion of the germanium body. It is preferable that the aluminum film which is deposited on the intrinsic back face be thicker than that deposited on the n-type diffused front face since it is usually desirable to alloy deeper into the intrinsic zone for forming the collector zone than it is feasible to alloy into the n-type disffused zone without penetrating completely therethrough.

As with the p-n-p unit discussed previously, the concentration of aluminum on the surfaces of the newly formed p-type zones after alloyage can be sufficiently hig so that wire leads may be bonded directly thereto. Hov ever, it is still advantageous to metallize an exposed po tion of the diffused n-type zone which serves as the ba zone to form electrodes 25 thereon to which a low r sistance connection can be made. Such a base electro may be formed by evaporation and subsequent alloya of a gold-antimony alloy in the manner previously di cussed.

It is, of course, feasible to prepare n-p-i-n units in a analogous manner by appropriate changes as discuss above in distinguishing between the processes of fabrica ing p-n-p and n-p-n units.

Moreover, in forming n-p-i-n and p-n-i-p units, su stitutions of the kind described in connection with t forming of n-p-n and p-n-p units may be made in the sem conductive materials and significant impurity elements en ployed, and in the nature of the formation of the emitt zone and the connections to the various zones.

Figure 7:
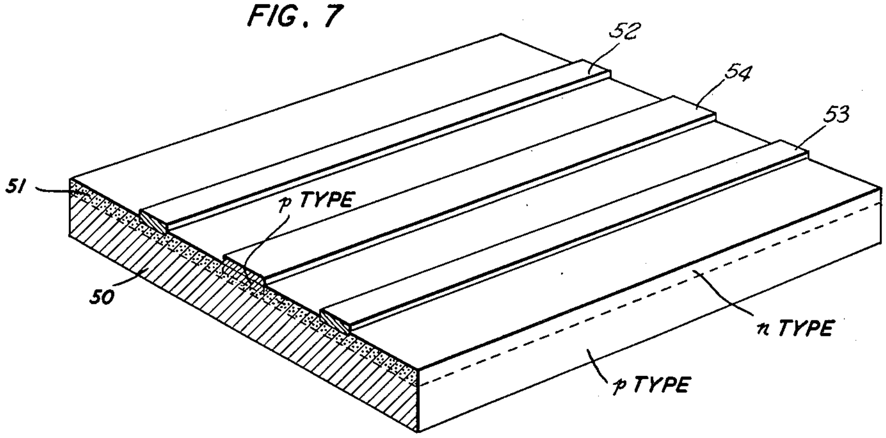
FIG. 7 shows a field-effect transistor fabricated in accordance with the invention.

In FIG. 7, there is shown a semiconductive body i tended for use in a field-effect transistor, which has bee fabricated in accordance with the principles described. . p-type germanium wafer 50 has had formed on one its broad faces a thin arsensic-diffused surface zone which is of n-type conductivity. Gold-antimony ele trodes 52 and 53 have been fused to spaced portions the n-type layer to form ohmic connections thereto whi serve as the source and drain electrodes. Intermedia electrodes 52 and 53, an aluminum film 54 has been fus to the surface layer for converting a skin portion to p-ty conductivity, which portion is to serve as the gate.

In operation, the thin n-type layer serves as the co ducting channel for electrons between the source and t drain. By forming a diffused surface layer of one co ductivity type on a larger body of opposite conductivi type, the body acts as a passive support whereby there faciliated the problem of realizing a thin conducting cha nel of a given conductivity type. By reverse biasing t rectifying junction formed between the gross p-type po tion of the body and the n-type diffused layer, the p-ty portion is made to act effectively as an insulator. T width of the conducting channel, and hence its condu tivity, is controlled by the space charge layer associat with the fused rectifying junction associated with the ga which is also biased in reverse.

The various modifications suggested above in the cour of describing the process of manufacture of semi-condu tive bodies for use in junction transistors may also made in the processes of preparing semiconductive bodi for use in field-effect transistors.

Accordingly, it is to be understood that the specific e bodiments described are merely illustrative of the ge eral principles of the invention.

For purposes of the claims, it will be convenient to u the term "conductivity type" to include both intrinsic a extrinsic conductivity types, and to use the term "extrins conductivity type" when reference only to p- and n-ty conductivities are intended.

What is claimed is:

1. The process of forming a junction transistor co prising the steps of heating a p-type germanium wafer arsenic vapor for a time and at a temperature to form n-type arsenic-diffused surface zone having an arse surface concentration no greater than of the order $10^{18}$ atoms per cubic centimeter, alloying aluminum ov a selected portion of the arsenic-diffused surface zone f converting said portion to p-type conductivity, etchi away a portion of the germanium wafer for forming the original p-type portion of the germanium wafer mesa which includes the aluminum-alloyed and arseni diffused portions of the wafer and providing emitter, ba and collector connections to the body.

2. The process of fabricating a germanium devi comprising the steps of heating a p-type germanium waf in arsenic vapor for a time and at a temperature to for without melting of the wafer an n-type arsenic-diffused surface layer having an arsenic concentration no greater than of the order of $10^{18}$ atoms per cubic centimeter, alloying an acceptor into a limited portion of the arsenic-diffused layer on one major face of the wafer for converting said limited portion to p-type, alloying a donor into a different limited portion of the arsenic-diffused layer on said major face of the wafer for forming a low resistance connection thereto, alloying an acceptor into the opposite major face of the wafer for forming a low resistance connection to the p-type bulk of the wafer, and etching a portion of said one major face for forming thereon a mesa which includes said acceptor-alloyed and donor-alloyed limited portions.

3. The process in accordance with claim 2 further characterized in that the acceptor and donor alloyed into said one major face are aluminum and antimony, respectively, and the acceptor alloyed into said opposite major face is indium.

4. A process for fabricating a transistor comprising the steps of diffusing from the gaseous state into a semiconductive wafer of one conductivity type a conductivity-type determining impurity characteristic of the opposite conductivity type for forming in the wafer a converted region of the opposite conductivity type in which the concentration of said impurity decreases with increasing distance into the region from the surface of said region, diffusing out from the semiconductive wafer some of said impurity previously diffused in for reducing the concentration of said impurity in a surface portion of said region, introducing a conductivity-type determining impurity characteristic of said one conductivity type into a portion of said surface portion for reconverting it to the one conductivity type and providing emitter, base and collector connections to the reconverted portion of the one conductivity type, the converted region of the opposite conductivity, and the bulk of the wafer of the one conductivity type.

5. The process of forming a junction transistor comprising the steps of heating a semiconductive wafer in the vapor of a conductivity-type determining impurity for a time and at a temperature to form without significant melting of the semiconductor an impurity-diffused surface zone of different conductivity and having a surface concentration of the diffused impurity no greater than of the order of $10^{18}$ atoms per cubic centimeter, converting a surface portion of said impurity-diffused surface zone to the extrinsic conductivity type opposite the extrinsic conductivity type characteristic of the remainder of said surface zone, etching the wafer for forming on the bulk portion thereof a mesa including the diffused surface zone and the converted surface portion, and forming an emitter connection to said converted surface portion, a base connection to the remainder of said impurity-diffused zone and a collector connection to the bulk portion.

6. The process of forming a junction transistor comprising the steps of heating a semiconductive wafer in the vapor of a first conductivity-type determining impurity for a time and at a temperature to form without significant melting of the semiconductor a base zone in which said first impurity is predominant, adding to a surface portion less than the whole of said zone a second conductivity-type determining impurity of type opposite the first impurity to form of said portion an emitter zone of the opposite extrinsic conductivity type, etching the semiconductive wafer to form a mesa including the emitter and base zones and providing an emitter connection to the emitter zone, a base connection to the base zone and a collector connection to a bulk portion of said wafer.

References Cited in the file of this patent

UNITED STATES PATENTS

| | | |
|---|---|---|
| 2,561,411 | Pfann | July 24, 1951 |
| 2,692,839 | Christensen et al. | Oct. 26, 1954 |
| 2,695,852 | Sparks | Nov. 30, 1954 |
| 2,697,269 | Fuller | Dec. 21, 1954 |
| 2,705,767 | Hall | Apr. 5, 1955 |
| 2,725,315 | Fuller | Nov. 29, 1955 |
| 2,736,847 | Barnes | Feb. 28, 1956 |
| 2,739,088 | Pfann | Mar. 20, 1956 |
| 2,767,358 | Early | Oct. 16, 1956 |
| 2,784,121 | Fuller | Mar. 5, 1957 |
| 2,793,145 | Clarke | May 21, 1957 |
| 2,811,653 | Moore | Oct. 29, 1957 |

FOREIGN PATENTS

| | | |
|---|---|---|
| 1,098,372 | France | Mar. 2, 1955 |

OTHER REFERENCES

The Bell System Technical Journal, vol. 33, No. 3 May, 1954; pages 517–533, page 524 relied upon.